Dec. 8, 1931.  J. WILLIAMS  1,835,363
SLEEVE VALVE MOTOR
Filed March 26, 1929   2 Sheets-Sheet 1
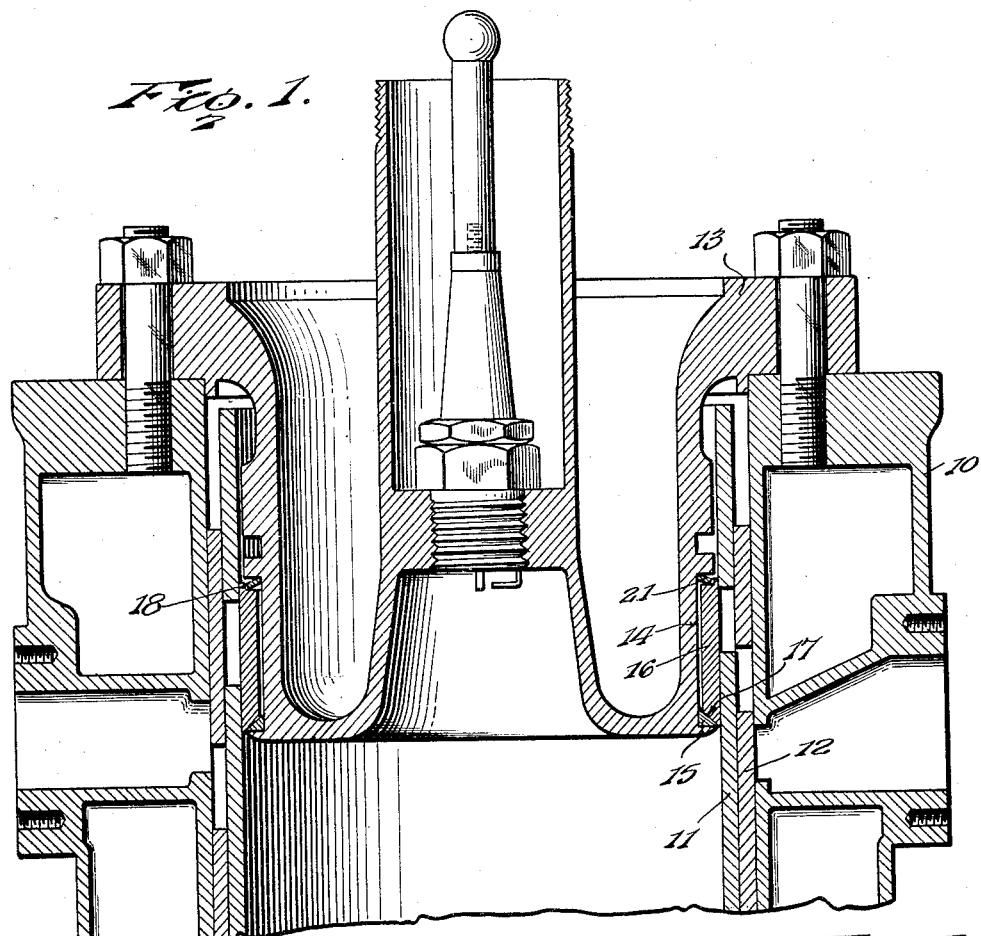
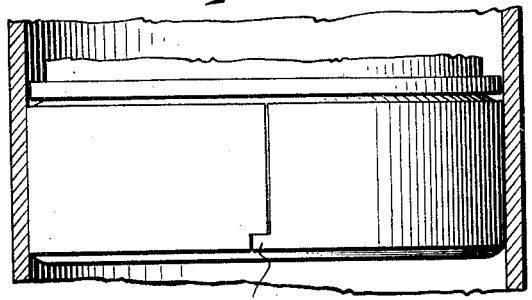
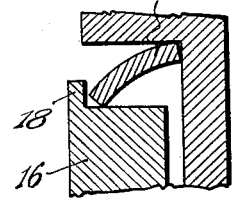
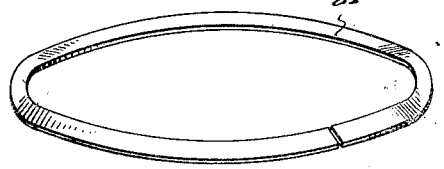
Inventor
Judson Williams.
By Lacey & Lacey, Attorneys Dec. 8, 1931.  J. WILLIAMS  1,835,363
SLEEVE VALVE MOTOR
Filed March 26, 1929  2 Sheets-Sheet 2
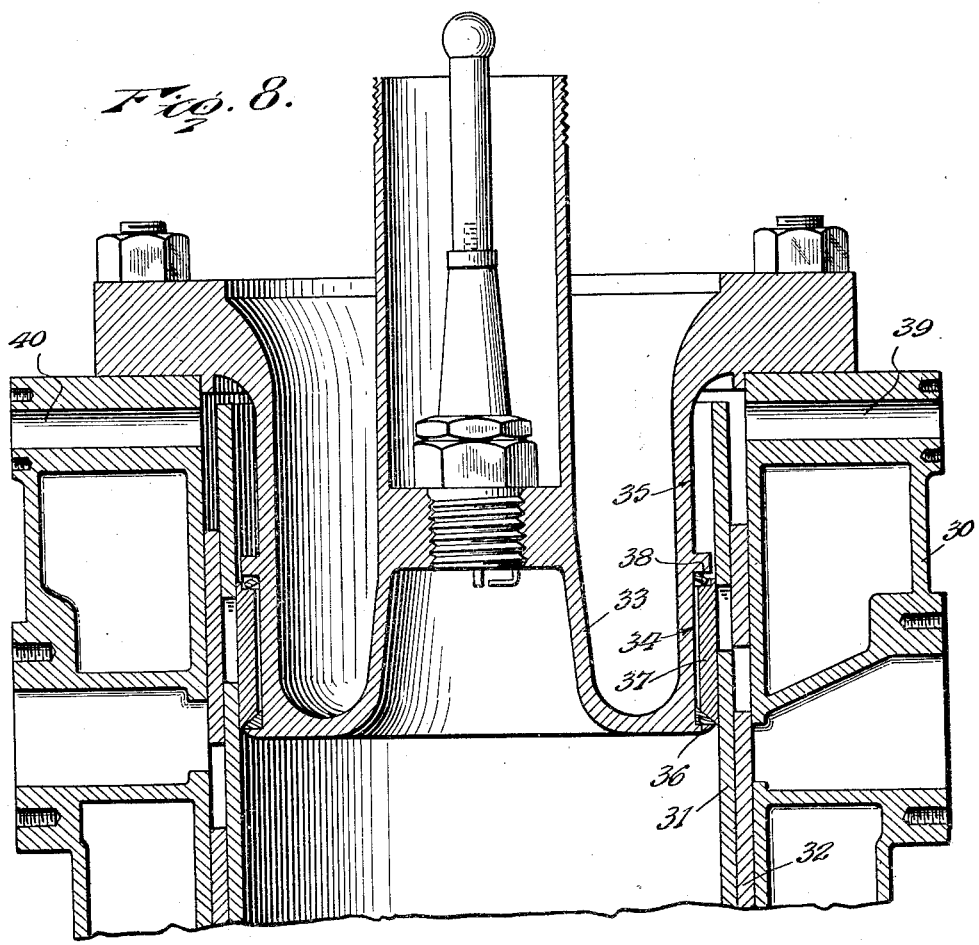
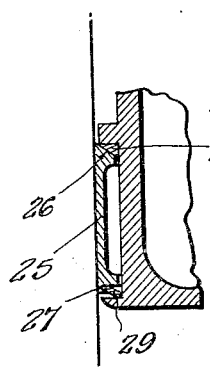
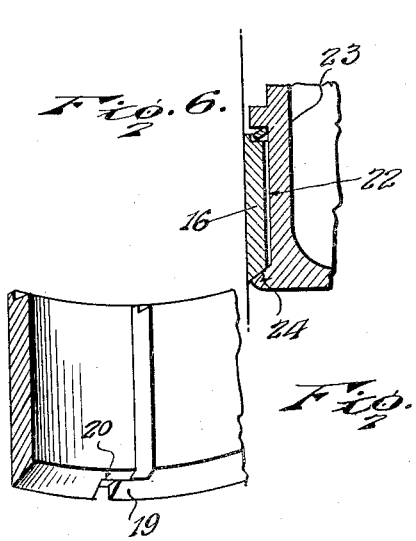
Inventor
Judson Williams.
By
Lacey & Lacey, Attorneys Patented Dec. 8, 1931

1,835,363

UNITED STATES PATENT OFFICE

JUDSON WILLIAMS, OF PHILADELPHIA, PENNSYLVANIA

SLEEVE VALVE MOTOR

Application filed March 26, 1929. Serial No. 350,076.

This invention relates to an improved cylinder, cylinder head, and junk ring assembly for sleeve valve motors.

The invention seeks, as one of its principal objects, to prevent compression leakage.

A further object of the invention is to prevent carbon deposits under the junk ring and to thus obviate the ultimate distortion of the ring and to also obviate carbon deposits above the ring such as might cause ultimate injury to the valves.

Another object of the invention is to prevent carbon deposits between the sleeve valves and thus obviate distortion of the sleeves by such deposits, or grabbing of the sleeves, or breaking of the pull pins of the sleeve-connecting rods, as well as breaking of said rods by torsional strain or sticking of the sleeves.

Still another object of the invention is to provide a junk ring which will at all times be more or less rigidly even though yieldably, supported and centered in true concentric relation to the axis of the cylinder to at all times exert a uniform pressure against the inner sleeve valve and thus provide a correspondingly rigid support for said valve which will, in turn, center and support the outer sleeve valve, to thus obviate eccentric movement of the sleeves.

A further object of the invention is to provide a ring assembly wherein slapping of the junk ring will be permanently overcome.

Another object of the invention is to provide a ring assembly wherein the radial tension of the ring will be uniformly distributed throughout the circumference thereof, wherein a sealed joint will be formed with the ring seat at the ends of the ring, and wherein locking of the ring against rotation will be rendered unnecessary.

The invention seeks, as a further object to provide a ring assembly which may be effectively used in any instance where the bottom wall of the ring groove of the cylinder head is cracked and wherein, should the inner sleeve be worn out-of-round, the ring may be inverted and compression utilized for distorting the ring to conform to the out-of-round shape of said sleeve.

And the invention seeks, as a still further object, to provide a means of cooling the cylinder head inside of the cylinder.

Other objects of the invention not specifically mentioned in the foregoing will appear during the course of the following description.

In the drawings,

Figure 1 is a fragmentary sectional view showing the present invention in connection with a conventional cylinder, sleeve valves, and head, Figure 2 is a fragmentary elevation showing the joint between the ends of the junk ring, Figure 3 is an enlarged perspective view of said joint, Figure 4 is a perspective view of the tensioning ring, Figure 5 is an enlarged fragmentary sectional view particularly showing the cross-sectional contour of the tensioning ring, Figure 6 is a fragmentary sectional view showing a slight modification of the invention, Figure 7 is a fragmentary sectional view showing the junk ring inverted, and Figure 8 is a vertical sectional view showing a further modification of the invention wherein the cylinder and cylinder head are formed for the circulation of a cooling fluid about the head within the cylinder.

Referring now more particularly to Figures 1 to 5 inclusive of the drawings, I have shown a conventional engine cylinder at 10, sleeve valves at 11 and 12 and cylinder head at 13, all of this structure being well recognized. Formed in the head is the usual ring groove 14.

In accordance with the present invention I employ an annular wedging ring 15. This ring is formed to fit in the groove 14 of the head 13, seating flat against the bottom wall of said groove and is provided with an upper inclined face sloping downwardly and outwardly to the periphery of the head. The ring is formed of cast iron and is transversely split so that the ring may be easily applied.

Removably received in the groove 14 above the ring 15 is a junk ring member 16 which, like the ring 15 is also preferably formed of cast iron. At its lower edge, the ring member 16 is formed with a beveled face 17 to seat flat against the inclined face of the ring 15, while at its upper edge, the ring member 16 is cut away to define a shoulder 18. As shown in Figures 2 and 3 the ring member 16 is split transversely so that said member may be readily applied about the cylinder head in the groove 14, and formed on said member at one end thereof is a triangularly shaped tongue 19 accommodated in a correspondingly shaped recess 20 in the opposite end of said member. As will be noted, the tongue 19 and recess 20 will at all times be covered by the upper beveled face of the ring 15 to thus provide a permanently sealed joint between the ends of the ring member 16.

Removably fitting in the groove 14 of the head 13 above the ring member 16 is a tensioning ring 21, preferably of cast iron. As shown in Figure 4, the ring 21 is transversely split at one point only while as brought out in Figure 5, said ring is transversely arched or curved. By separating the ends of the ring said ring may be readily applied about the cylinder head within the groove 14 and, as will be observed, the inner periphery of the ring more or less closely hugs the bottom wall of said groove at the top thereof, while the outer periphery of the ring bears against the upper edge of the ring member 16 in spaced relation to the shoulder 18. The ring 16 is accordingly limited against upward movement by the top wall of the ring groove 14 so that this ring is constantly held under tension to press the ring member 16 endwise downwardly with the result that the beveled face 17 of said member is caused to coact with the beveled face of the ring 15 for expanding the ring member 16 against the sleeve valve 11.

Attention is now directed to the fact that due to the frusto-conoidal shape of the ring 21 and the further fact that the ring is split at one point only, pressure on the outer periphery of the ring, tending to flatten said ring, will be equally distributed throughout the circumference of the ring. Accordingly, the ring 15 will exert an equal pressure against the upper edge of the ring member 16 throughout the entire circumference thereof. As a result the ring member will, at all times, be caused to coact with the ring 15 in such manner as to be accurately centered throughout its circumference by the ring 15 on the head 13 and will be caused to exert a uniform pressure throughout its circumference against the sleeve valve 11. The ring member will, therefore, more or less rigidly even though yieldably, support the valve 11 with respect to the head and, of course, the valve 11 will in turn support the valve 12. Slapping of the valves will thus be obviated. Furthermore, the wear of the ring member 16 on the valve 11 will be equally distributed throughout the circumference of said valve so that the tendency of the valve 11 to wear out-of-round will be reduced to a minimum. As the member 16 wears, such wear will be taken up by the ring 21 so that the beveled faces of said member and of the ring 15 will at all times be held in binding contact to provide a constantly sealed joint therebetween as well as between the ring member 16 and the sleeve 11. Compression leakage past the ring member 16 will thus be substantially eliminated or at least reduced to the very minimum. The formation of carbon deposits between the upper end portions of the valves will thus be obviated while also various other troubles arising from compression leakage will be reduced to a minimum. Since the elements 15, 16 and 21 are all of cast iron they will not be affected by the temperature of ordinary operating conditions of the engine.

As will be perceived the ring 15 may be used in conjunction with a cylinder head wherein the bottom wall of the ring groove 14 thereof is cracked or chipped since the ring 15 will overlie the crack or chip to provide a perfect seat for the ring member 16. In Figure 6 of the drawings I have shown a slight modification of the invention wherein the ring 15 is omitted and the bottom wall of the ring groove 22 of the cylinder head 23 is formed with a beveled face 24 to coact with the beveled face 17 of the ring member 16. Obviously, this construction could be easily embodied in the cylinder head as originally manufactured.

In many instances the inner sleeve valve 11, in an engine which has been in service for considerable time, becomes so badly worn that the sleeve is extremely out-of-round. To meet this situation, I provide, as shown in Figure 7, a relatively thin ring member 25 flanged adjacent its upper and lower edges to provide a beveled face 26 at one edge of the ring while the flange at the opposite edge of the ring is cut away to form a shoulder 27. Coacting with the beveled face 26 is a ring 28 like the ring 15 and coacting with the shoulder 27 is a ring 29 like the ring 21. Thus, the ring 29 will urge the ring 25 to coact with the wall of the sleeve valve while a sealed joint will be provided between the member 25 and the ring 28 at the upper edge of said member. Accordingly, compression entering into the ring groove of the cylinder head behind the member 25 cannot escape up past said ring member and will accordingly be confined within the ring groove to cooperate with the ring 29 for expanding said ring member. The ring member 25 will thus be distorted to conform to the out-of-round shape of the sleeve valve.

In Figure 8 of the drawings I have shown a modification of the invention wherein provision is made for cooling the cylinder head. The cylinder is indicated at 30, the sleeve valves at 31 and 32 and the head at 33. The head is formed with a ring groove 34 and as will be observed, the head is cut away as indicated at 35 to provide a relatively wide space between the valve 31 and the head. Seated in the bottom of the ring groove is a ring 36 coacting with which is a ring member 37, and coacting with the upper edge of said ring member is a ring 38. The parts 36, 37 and 38 are identical with the parts 15, 16 and 21 previously described and serve like functions. Formed through the upper end wall of the cylinder at one side thereof is a passage 39 while at the opposite side of the cylinder is provided a similar passage 40. Thus, a fluid such as air or oil may be introduced through the passage 39, for instance, to circulate about the upper ends of the sleeve valves as well as about the cylinder head within the cylinder, to emerge through the passage 40 for cooling the head as well as the upper end portions of the valves.

Having thus described the invention, I claim:

1. In an internal combustion engine, a sleeve valve, a cylinder head provided with a ring groove and with means forming a ring seat inclined towards the periphery of said groove, a junk ring member accommodated in said groove to coact with said seat, and means pressing said member endwise against said seat for expanding said member against said valve.

2. In an internal combustion engine, a sleeve valve, a cylinder head, means forming a seal between the head and valve and exerting a substantially equal pressure on the valve throughout the circumference thereof, expanding means for said sealing means, and means pressing said sealing means endwise to coact with said expanding means.

3. In an internal combustion engine, a sleeve valve, a cylinder head, means forming a seal between the head and valve, expanding means centering said sealing means with respect to the axis of the head to coact with the valve, and means pressing said sealing means endwise to coact with said expanding means.

4. In an internal combustion engine, a sleeve valve, a cylinder head, means forming a seal between the head and valve, means tending to expand said sealing means substantially equally throughout the circumference thereof to coact with the valve, and means pressing said sealing means endwise to coact with said expanding means.

5. In an internal combustion engine, a sleeve valve, a cylinder head having a ring seat inclined towards the periphery of the head, a ring member coacting with said seat and provided at its ends with means constantly covered by the seat to form a constantly closed joint between said member and the seat, and means urging the member endwise to coact with the seat and expanding said member to coact with the valve.

6. In an internal combustion engine, a sleeve valve, a cylinder head, a junk ring member carried by the head, expanding means at one end of said member, the opposite end of said member being provided with a shoulder, and a tensioning element confined between the head and said shoulder and acting to press the ring member endwise to coact with said expanding means for expanding the ring member against the valve.

7. In an internal combustion engine, a sleeve valve, a cylinder head having a beveled seat, a split junk ring member having a beveled edge disposed on said seat, and a split cast iron tensioning ring confined between the head and the opposite end of the junk ring member and pressing the junk ring member endwise against said seat to expand the junk ring member against the valve.

8. In an internal combustion engine, a sleeve valve, a cylinder head having a groove, a ring seat in said groove having a beveled edge inclined towards the periphery of the head, a junk ring member in said groove having a beveled edge disposed on said seat, a shoulder on the opposite edge of the junk ring member, and a substantially frusto-conical tensioning ring confined in said groove by said shoulder and pressed by the head to exert an endwise pressure against the junk ring member toward said seat.

9. In an internal combustion engine, a sleeve valve, a cylinder head, a beveled ring seat on the head forming a seal between the head and valve, a junk ring member having a beveled end edge disposed on said seat and uniformly expanding said seat to coact with the valve, and a cast iron substantially frusto-conical split ring confined between the head and opposite end edge of the junk ring member and exerting throughout its circumference a substantially uniform pressure against said junk ring to press the junk ring endwise against said seat for expanding the junk ring against said valve.

In testimony whereof I affix my signature.

JUDSON WILLIAMS. [L. S.]